March 13, 1934.  A. C. DAVIDSON  1,950,659
SPRING FRICTION DEVICE
Filed Nov. 9, 1931   3 Sheets-Sheet 1
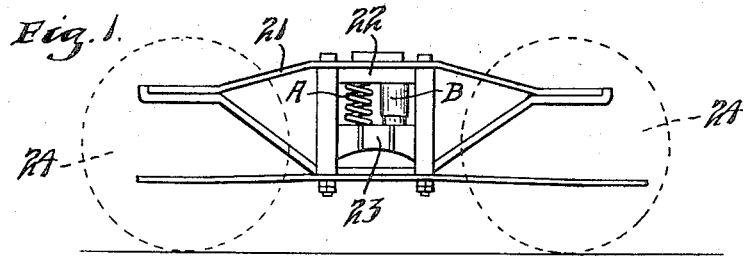
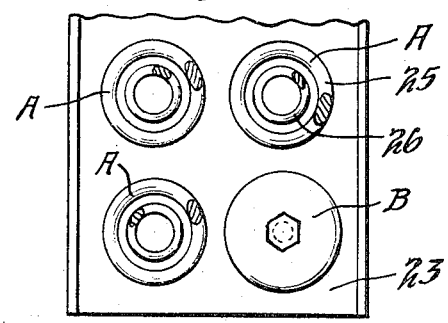
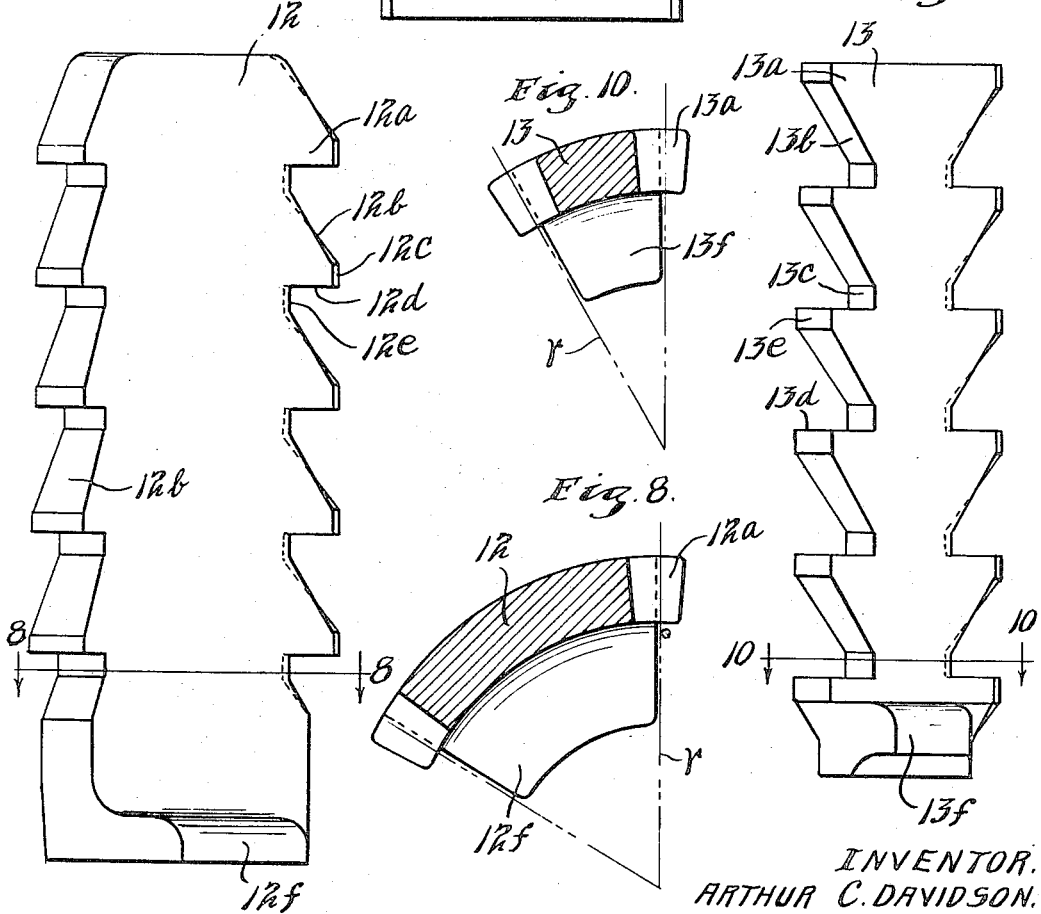
INVENTOR.
ARTHUR C. DAVIDSON.
BY HIS ATTORNEYS
Williamson & Williamson March 13, 1934. A. C. DAVIDSON 1,950,659
SPRING FRICTION DEVICE
Filed Nov. 9, 1931 3 Sheets-Sheet 2
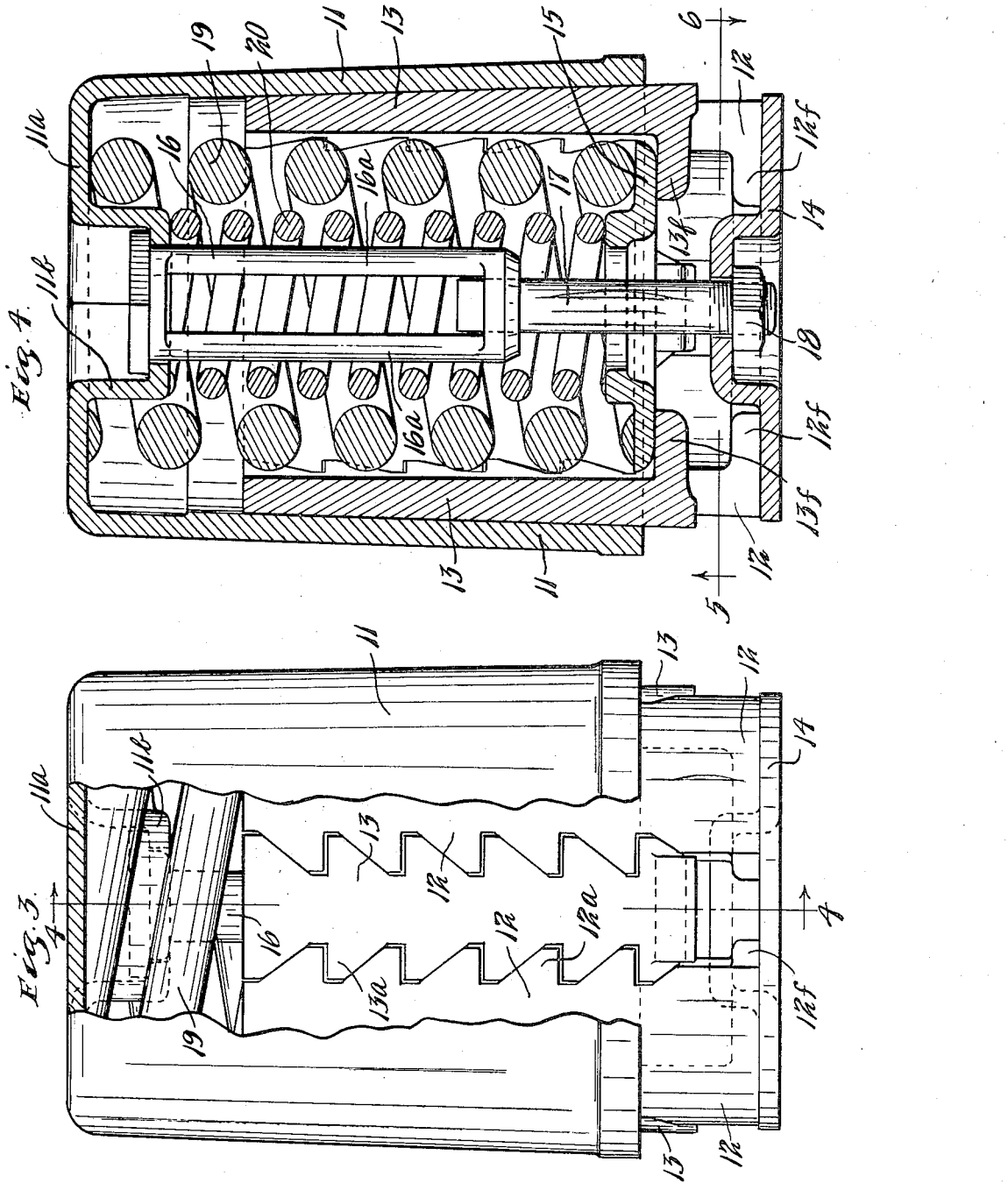
INVENTOR,
ARTHUR C. DAVIDSON.
BY HIS ATTORNEYS.
Williamson & Williamson

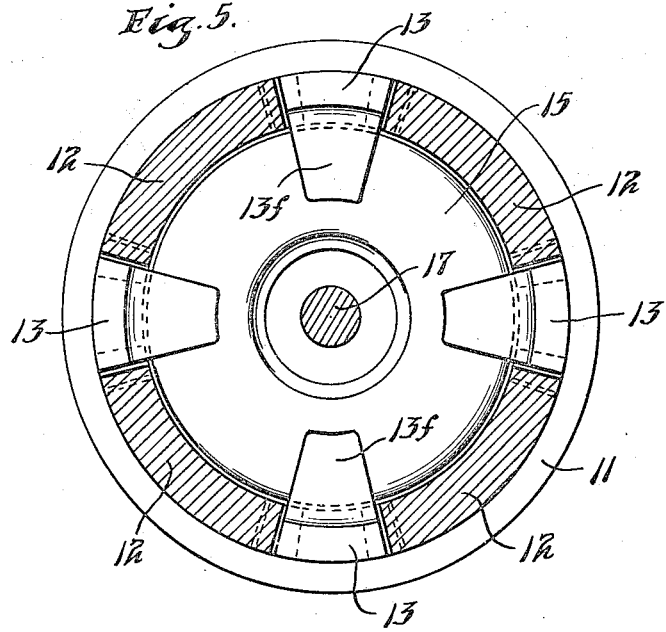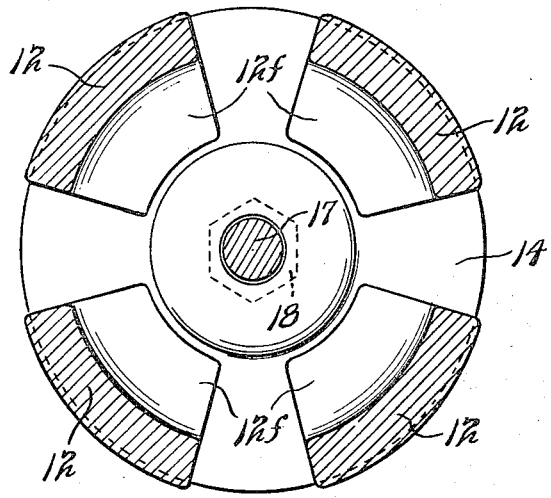

Patented Mar. 13, 1934

1,950,659

UNITED STATES PATENT OFFICE 1,950,659

SPRING FRICTION DEVICE

Arthur C. Davidson, Chicago, Ill.

Application November 9, 1931, Serial No. 573,862

3 Claims. (Cl. 267—9)

This invention relates to spring friction devices which, although capable of use wherever desired, are particularly adapted for use on railroad car trucks.

It is the primary object of this invention to provide a novel and improved spring friction device of great strength, wherein the natural rebound action of the device will be dampened through frictional engagement between the parts of the device as the device is compressed.

It is another object of the invention to provide a novel spring friction device wherein the compressive action of the device must take place against resistance more than proportional to the movement of the device as it is being compressed.

These and other objects and advantages of the present invention will more fully appear from the following description, made in connection with the accompanying drawings, wherein like reference characters refer to the same or similar parts throughout the various views, and, in which, Fig. 1 is a view in side elevation of portions of a car truck, wherein one of the spring friction devices embodying the invention is used in conjunction with other springs of ordinary type;

Fig. 2 is a plan view of one end of the spring plank of the truck with the springs and spring friction devices illustrated in Fig. 1, located in position thereon;

Fig. 3 is a view in front elevation of a spring friction device embodying the invention, a portion of the casing being broken away to more clearly illustrate the construction of the device;

Fig. 4 is a vertical section taken on the line 4—4 of Fig. 3, as indicated by the arrows;

Fig. 5 is a horizontal section taken on the line 5—6 of Fig. 4 in the direction as is indicated by the arrow adjacent the numeral 5;

Fig. 6 is a horizontal section taken on the line 6—5 of Fig. 4 in the direction indicated by the arrow adjacent the numeral 6;

Fig. 7 is a perspective view illustrating one of the long friction fingers used;

Fig. 8 is a horizontal section taken on the line 8—8 of Fig. 7 as indicated by the arrows, the dot and dash lines of Fig. 8 indicating radii of a circle;

Fig. 9 is a perspective view illustrating one of the short friction fingers used; and Fig. 10 is a horizontal section taken on the line 10—10 of Fig. 9 as indicated by the arrows, the dot and dash lines of Fig. 10 indicating radii of a circle.

Referring to the drawings, in accordance with the present invention, there is provided a spring friction device B having a casing 11 of substantially hollow cylindrical shape. This casing is open at one end and it is closed at its other end by a wall 11a having a polygonal cup-shaped, apertured, depressed portion 11b formed therein. For the purpose of description, the upper end of the casing may be considered to be the end closed by the wall 11a, while the lower end of the casing may be considered to be the open end of the same, as shown in the drawings. Obviously, either end may be placed upward. The interior diameter of the lower end of the casing 11 is slightly greater than the interior diameter of the upper end of the same and the inner wall of the casing, accordingly, tapers very slightly inwardly from its open end toward its closed end. A plurality of long fingers 12 forming friction shoes and a plurality of short fingers 13 forming friction shoes fit within the casing 11 and normally project at their lower ends outwardly beyond the lower open end of the casing 11. The fingers 12 project outwardly beyond the open end of the casing 11 a greater distance than do the fingers 13 and for this reason the fingers 12 may be designated long fingers and the fingers 13 may be designated short fingers. Fingers 12 and 13 extend longitudinally of the casing and they are arcuately shaped in cross section as best shown in Figs. 8 and 10, so that the outer surfaces of the fingers will engage the inner cylindrical wall of the casing 11. Long fingers 12 are alternately circumferentially spaced relative to the short fingers 13 and the long and short fingers, when assembled together, form a many part substantially cylindrical shell which fits within the casing 11. Long fingers 12 have a plurality of teeth 12a cut in the edges thereof and these teeth form diagonal wedge surfaces 12b, vertical surfaces 12c, horizontal surfaces 12d and vertical surfaces 12e. The diagonal wedge surfaces 12b project diagonally downwardly and outwardly toward the lower open end of the casing 11. The various surfaces 12b, 12c, 12d and 12e of all fingers 12 are radially cut relative to a common axial center in planes normal thereto, as indicated by the radii r illustrated by dot and dash lines Fig. 8. As the outer side surfaces of the fingers 12 are shaped to fit the inner cylindrical wall of the casing 11, these radii r will be the radii of circles taken about the longitudinal axial center line of casing 11 in planes normal thereto. Short fingers 13 also have a plurality of teeth 13a cut in the edges thereof and these teeth form diagonal wedge surfaces 13b, vertical surfaces 13c, horizontal surfaces 13d and vertical surfaces 13e.

The diagonal wedge surfaces 13b project diagonally upwardly and outwardly from the fingers toward the closed end of the casing 11. The various surfaces 13b, 13c, 13d and 13e of all fingers 13 are radially cut relative to the same common axial center line as the surfaces 12b, 12c, 12d and 12e and in planes normal to said center line, as shown by the radii r indicated by dot and dash lines in Fig. 10. The teeth 13a of the short fingers 13 mate with the teeth 12a of adjacent long fingers as best illustrated in Fig. 3, so that the various wedge surfaces 12b of the long fingers rest on and engage the various wedge surfaces 13b of the short fingers.

The lower or outer ends of the long fingers 12 projecting below the open end of the casing 11, have inturned flanges or lips 12f and a cap plate 14 has a cup-shaped upwardly extending medial portion which is disposed centrally from the lips 12f and this plate has an outer flange which bears against the outer or lower ends of the long fingers 12 and the lips 12f. The short fingers 13 at their lower or outer ends have inturned flanges or lips 13f spaced toward the open end of the casing 11 from the lips 12f and resting against the upper surfaces of these lips 13f, as viewed in the drawings, is a plate 15 having an upwardly extending, apertured, cup-shaped portion. A cylindrical yoke 16 has a polygonal-shaped head which fits within the cup-shaped portion 11b of wall 11a to prevent rotation of the yoke and the head bears against this wall, and this yoke projects downwardly through the aperture in the cup-shaped portion 11b into the casing 11 centrally thereof. This cylindrical yoke 16 has longitudinally extending slots 16a cut at diametrically opposite points in its sides and within this yoke there is slidably mounted the T-shaped head of a stud 17, the head fitting within the slots 16a and the slots acting as guide slots to permit of vertical movement of the stud relative to the yoke 16. The stud 17 projects through a central aperture in the lower end of the yoke 16 and also extends centrally through the aperture in the plate 15 and also through a central aperture in the cap plate 14. The lower end of the stud 17 is screw-threaded and a nut 18 is screwed onto the lower end of the stud and this nut bears against the cup-shaped portion of the cap plate 14. A heavy coiled pressure spring 19 at one end surrounds the cup-shaped portion 11b of wall 11a and bears against the wall 11a and at its other end this spring surrounds the cup-shaped portion of the plate 15 and bears against the outer flange of this plate. A smaller coiled pressure spring 20, having many more turns than the spring 19, surrounds the yoke 16 and stud 17 and bears at one end against the cup-shaped portion 11b of wall 11 and it bears at its other end against the cup-shaped portion of the plate 15. Preferably the fingers 12 and 13 taper inwardly slightly from their lower ends toward their upper ends, so that all portions of the outer surfaces of these fingers within the casing 11 will engage the inner cylindrical surface of the casing without disengagement of certain of the wedge surfaces 12b from their abutting wedge surfaces 13b. In other words, the upper portion of the many part shell formed by the long fingers 12 and the short fingers 13 will be of slightly smaller diameter exteriorly, than the exterior diameter of the lower edge of this shall, so that the surfaces 12b and 13b will remain in abutment at all times, with the outer surfaces of the shell engaging the inner cylindrical surface of the casing 11.

Although the spring friction device of the present invention is adapted for use at practically any point where a spring is required, the device is particularly adapted for use on car trucks. In Figs. 1 and 2 the spring of the invention is shown in position for use on a car truck. Referring to these views of the drawings, there are illustrated portions of a side frame 21 of a well known type of car truck which has been in use for many years. The truck bolster of the car truck is designated by the numeral 22 and the spring plank by the numeral 23, while wheels of the car truck, shown in dotted lines Fig. 1, are designated by the numeral 24. Three compound springs A, including outer heavy coiled springs 25 and lighter inner coiled springs 26, rest on one end of the spring plank 23 and react between the spring plank and the truck bolster 22. With these three springs A of well known construction, I prefer to use, at least, one of my improved spring friction devices B, and the cap plate 14 of this spring is shown as resting on the device plank 23, while the closed end 11a of the casing of the device bears against the truck bolster 22.

During the movement of the car truck shown, as the wheels 24 run over a high portion of track, the spring plank 23 will move toward the truck bolster 22 tending to compress the springs A and the spring friction device B. The springs A have a natural period of compression and extension and if this natural period can be interrupted, the rebound action of these springs after they are compressed, may be considerably checked. The spring friction device B, used in conjunction with the springs A, prevents the compression and subsequent extension of the springs A in their natural period and at the same time the device B serves to take a great part of the load from the springs A to prevent the possibility of breakage of these springs. As pressure is applied between the wall 11a and the cap plate 14 of the device B, the long fingers 12 tend to move toward the wall 11a and as these long fingers move toward the wall 11a, the short fingers 13 will tend to move with the same against the tension of the two coiled springs 19 and 20. The short fingers 13 meeting the resistance of the coiled springs 19 and 20 will, of course, offer resistance to the movement of the long fingers 13 and as the diagonal wedge surfaces 12b of the long fingers engage the diagonal wedge surfaces 13b of the short fingers, the long fingers tend to move relative to the short fingers, thereby causing a wedge action between the fingers. This wedging action tends to cause the many part shell formed by the fingers 12 and 13 to expand circumferentially, i. e. the fingers 12 and 13 tend to move radially outwardly from the axial center line of the casing 11. As the outer surfaces of the fingers 12 and 13 engage the inner cylindrical wall of the casing 11, the frictional resistance to the sliding movement of the fingers toward the wall 11a of the casing, increases tremendously upon the compression of the spring B. The taper given to the inner cylindrical surface of the casing 11, and to the fingers 12 and 13 increases this frictional resistance. Thus, as the long fingers 12 are moved closer toward the wall 11a, the resistance to the sliding movement of these fingers is increased much more than proportional to the movement of the fingers. This resistance retards the compressive action of the spring friction device B and as the springs A cannot be compressed unless the device B is compressed therewith, the natural period of compression of the springs A is retarded. When the compressive force is balanced by the resistance offered by the springs A and device B, the springs will be released to permit the rebound action or extension of these springs. As the natural period of compression of the springs A is retarded by the device B, this rebound action of the various springs A and device B will be dampened and very largely checked.

As the compressive force necessary to move the fingers 12 toward the wall 11a through a given distance, is much more than proportionately greater during the latter part of the compressive action than during the first part thereof, it will be seen that the spring B is self adapting far beyond the range of an ordinary spring to cushion not only comparatively light jars and jolts, but also to cushion heavy jars and jolts. The friction area afforded between the diagonal wedge surfaces 12b and 13b of the fingers 12 and 13 is large and the friction area between the outer surface of the fingers and the inner cylindrical wall of the casing is also large. Due to these large frictional areas, the wear of the parts is small. Adjustment of the tension of the spring can be readily varied by screwing the nut 18 inwardly or outwardly on the stud 17.

Although it is not essential to use the smaller coiled spring 20 with the device, it is desirable to use this smaller spring with the large spring 19. Although the spring friction device of the invention is peculiarly adapted for use on railroad car trucks, it will be seen that it may be used either alone or in conjunction with other springs wherever cushioning action is desired. For some purposes it may be desirable to reverse the formation of the teeth on the long and short fingers to produce a snubbing or shock absorbing action.

It will, of course, be understood that various changes may be made in the form, details, arrangement and proportions of the various parts without departing from the scope of the present invention.

What is claimed is:—

1. A spring friction device having in combination a hollow substantially cylindrical casing open at one end and having a closure at its other end, a plurality of first and second fingers each of arcuate-shape in cross section and assembled together in alternate circumferential arrangement to form a many part cylindrical shell bearing against the inner wall of said casing, the first fingers normally projecting outwardly beyond the open end of said casing in spaced relation from the outer portions of said second fingers, said first fingers having a plurality of teeth cut in their edges forming wedging surfaces inclined diagonally outwardly and toward the open end of said casing, said second fingers having a plurality of teeth cut in their edges, mating with said teeth in said first fingers and forming wedging surfaces directly engaging the wedging surfaces of said first fingers and inclining inwardly, and towards the open end of said casing and a pressure spring nested chiefly within said shell and reacting between said closure and the outer portions of said second fingers.

2. A spring friction device having in combination, a hollow substantially cylindrical casing open at one end and having a closure at its other end, the inner wall of said casing tapering from its open end towards said closure, a plurality of not less than four long and not less than four short fingers assembled together in circumferential relation alternately to form a many part cylindrical shell bearing against the inner wall of said casing, said fingers all being of arcuate-shape in cross section and the outer surfaces of said fingers tapering from their outer ends adjacent the open end of said casing towards said closure, said long and short fingers each having a plurality of teeth cut in their edges, the teeth in said long fingers mating with the teeth in said short fingers and the teeth in the respective fingers forming a multiplicity of directly engaging wedging surfaces inclined relative to the length of said casing, a spring nesting chiefly within said shell and reacting between one group of fingers and said closure, said first fingers normally projecting outwardly beyond the open end of said casing in spaced relation from the outer ends of said second fingers and having inturned lugs at their outer ends, said spring reacting against said lugs of said first fingers.

3. A spring friction device having in combination a hollow substantially cylindrical casing open at one end and having a closure at its other end, a plurality of first and second fingers each of arcuate-shape in cross section and assembled together in alternate circumferential arrangement to form a many part cylindrical shell bearing against the inner wall of said casing, the first fingers normally projecting outwardly beyond the open end of said casing in spaced relation from the outer portions of said second fingers, said first fingers having wedging surfaces inclined diagonally outwardly and toward the open end of said casing, said second fingers having wedging surfaces directly engaging the wedging surfaces of said first fingers and inclining inwardly, and towards the open end of said casing and a pressure spring nested chiefly within said shell and reacting between said closure and the outer portions of said second fingers.

ARTHUR C. DAVIDSON.